United States Patent [19]
Holler et al.

[11] Patent Number: 5,256,911
[45] Date of Patent: Oct. 26, 1993

[54] NEURAI NETWORK WITH MULTIPLEXED SNYAPTIC PROCESSING

[75] Inventors: Mark A. Holler, Palo Alto; Simon M. Tam, Redwood City, both of Calif.

[73] Assignee: Intel Corporation, Santa Clara, Calif.

[21] Appl. No.: 896,204

[22] Filed: Jun. 10, 1992

[51] Int. Cl.$^5$ .............................................. G06F 15/18
[52] U.S. Cl. ...................................... 307/201; 395/24
[58] Field of Search .................. 307/201, 494, 243; 395/21, 24

[56] References Cited

U.S. PATENT DOCUMENTS

| | | | |
|---|---|---|---|
| 5,028,810 | 7/1991 | Castro et al. | 307/201 |
| 5,131,073 | 7/1992 | Furuta et al. | 307/201 X |
| 5,148,045 | 9/1992 | Oyanagi | 395/24 X |
| 5,155,377 | 10/1992 | Castro | 307/201 |
| 5,165,009 | 11/1992 | Watanabe et al. | 395/27 |

OTHER PUBLICATIONS

Hollis and Paulos, "Artificial Neurons Using Analog Multipliers", Dept. Elect. & Comp. Eng., N.C. State, Raleigh, N.C.

Primary Examiner—David R. Hudspeth
Attorney, Agent, or Firm—Blakely, Sokoloff, Taylor & Zafman

[57] ABSTRACT

In an apparatus for multiplexed operation of multi-cell neural network, the reference vector component values are stored as differential values in pairs of floating gate transistors. A long-tail pair differential transconductance multiplier is synthesized by selectively using the floating gate transistor pairs as the current source. Appropriate transistor pairs are multiplexed into the network for forming a differential output current representative of the product of the input vector component applied to the differential input and the stored reference vector component stored in the multiplexed transistor pair that is switched into the multiplier network to function as the differential current source. Pipelining and output multiplexing is also described in other preferred embodiments for increasing the effective output bandwidth of the network.

22 Claims, 9 Drawing Sheets

FIG_1 (PRIOR ART)
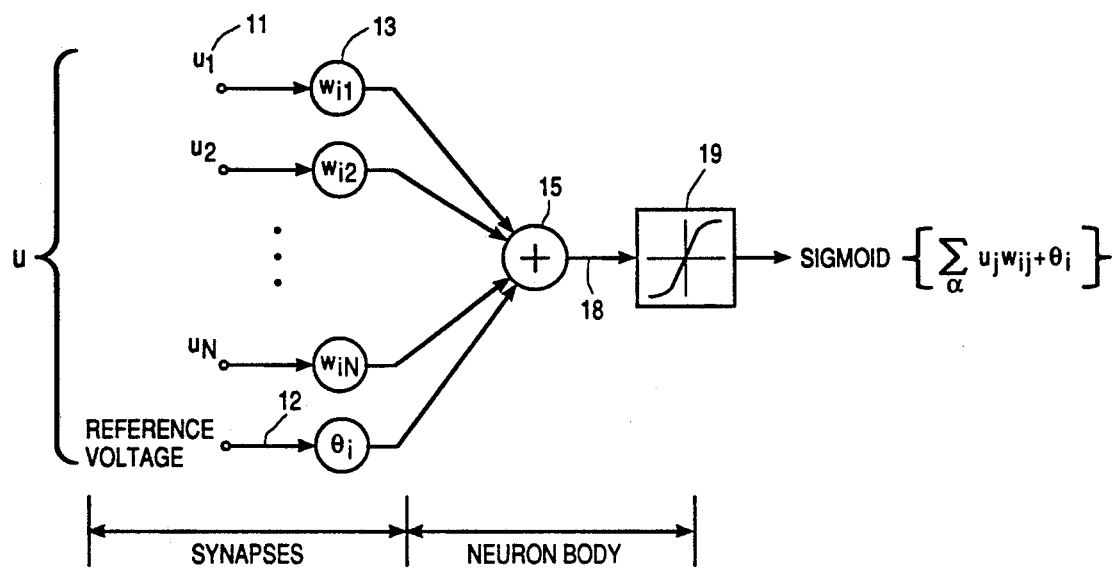
FIG_2 (PRIOR ART)
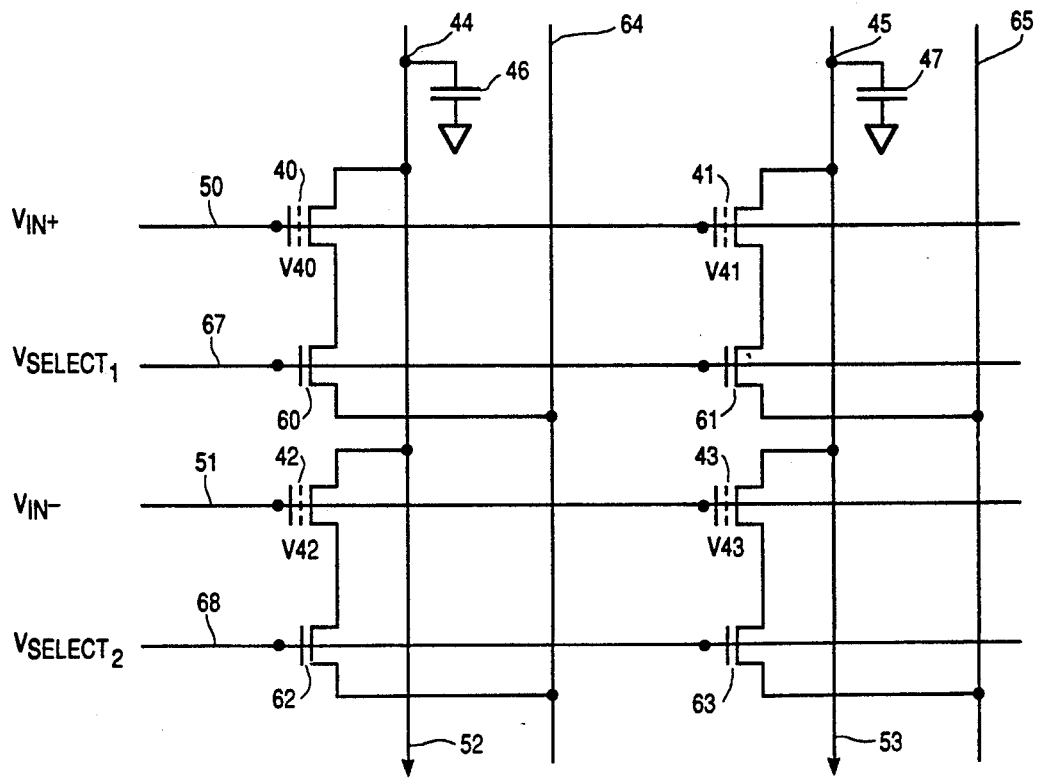

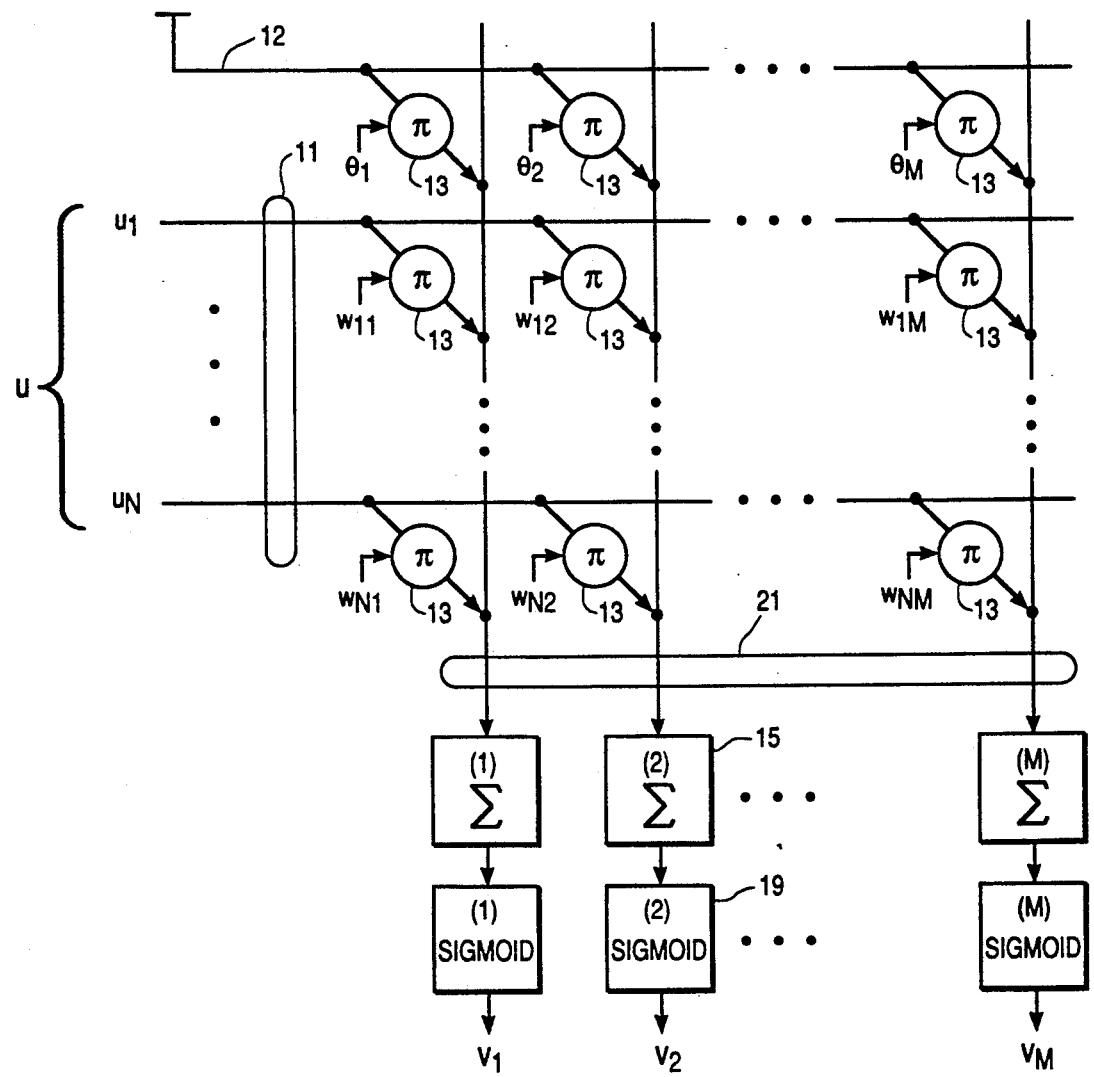
FIG_3 (PRIOR ART)

FIG_4 (PRIOR ART)
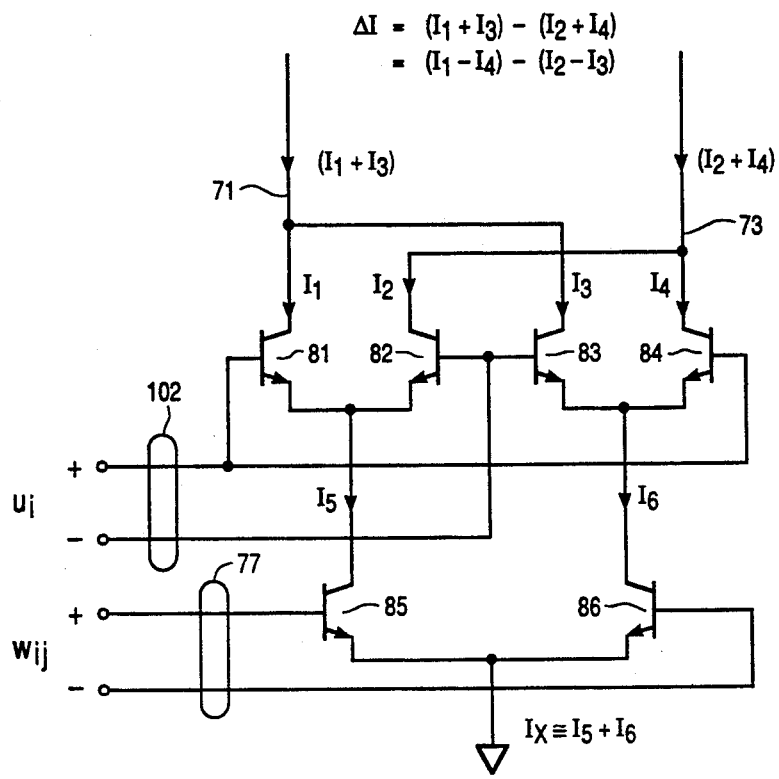
FIG_5 (PRIOR ART)
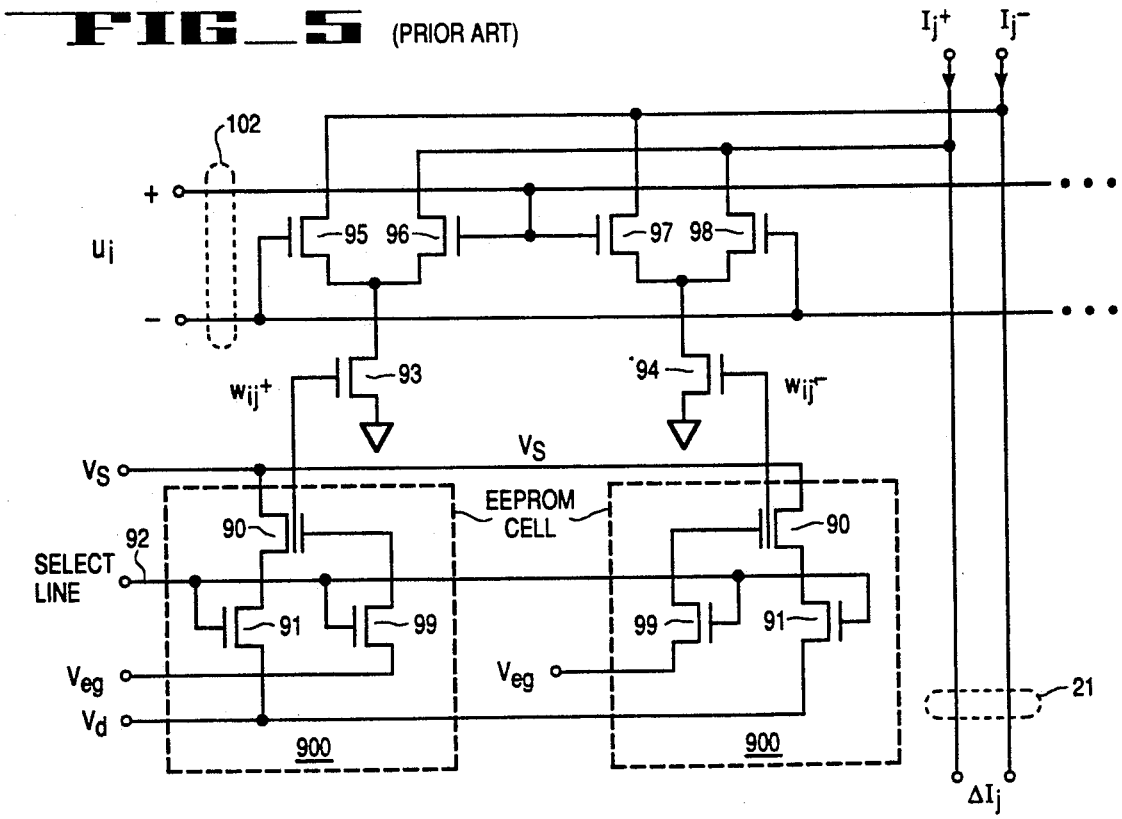

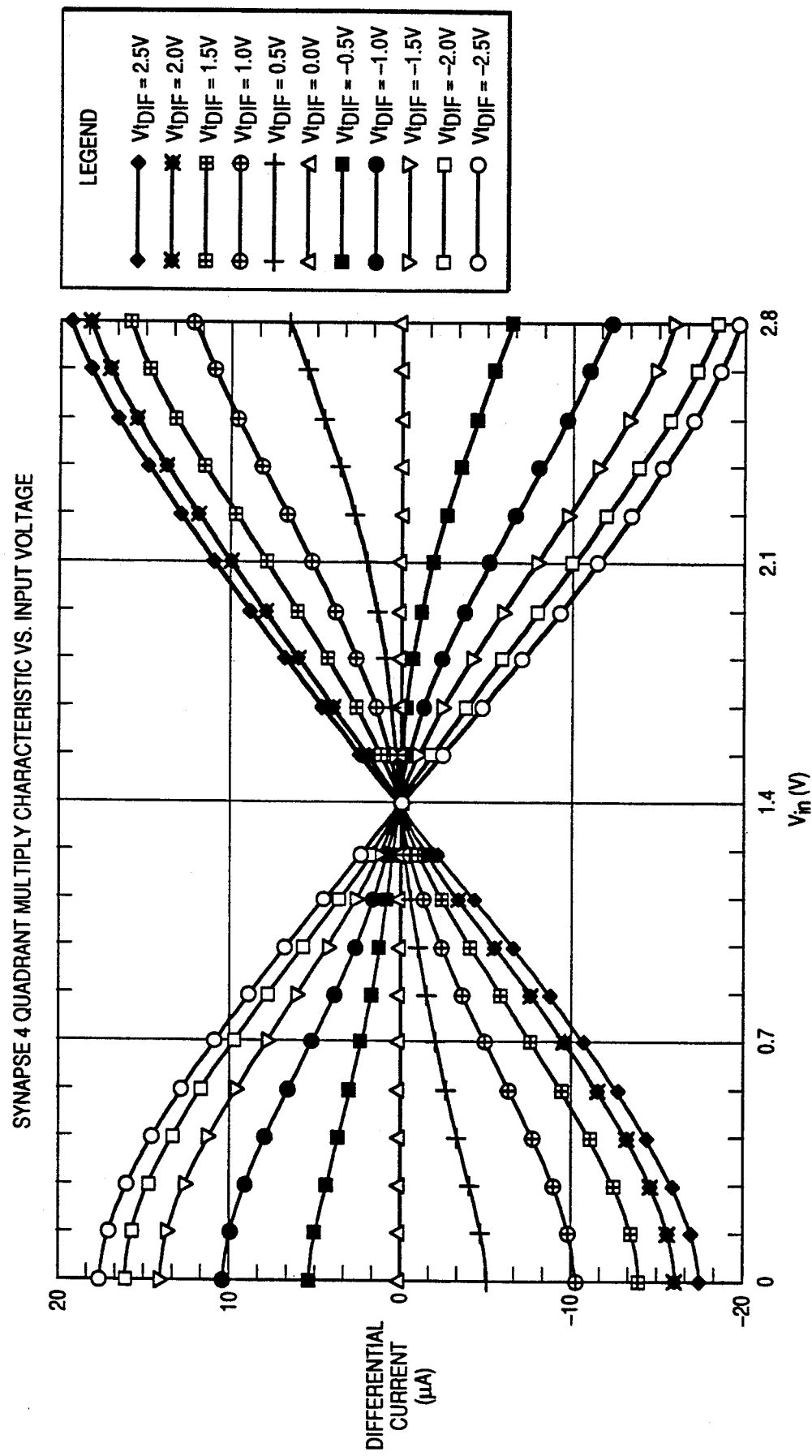

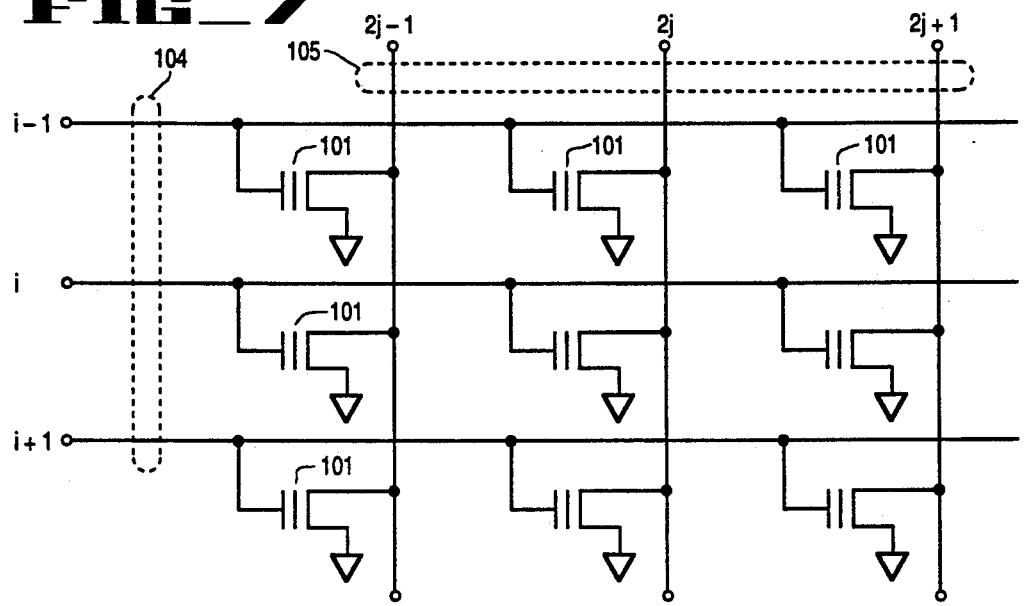
FIG_7
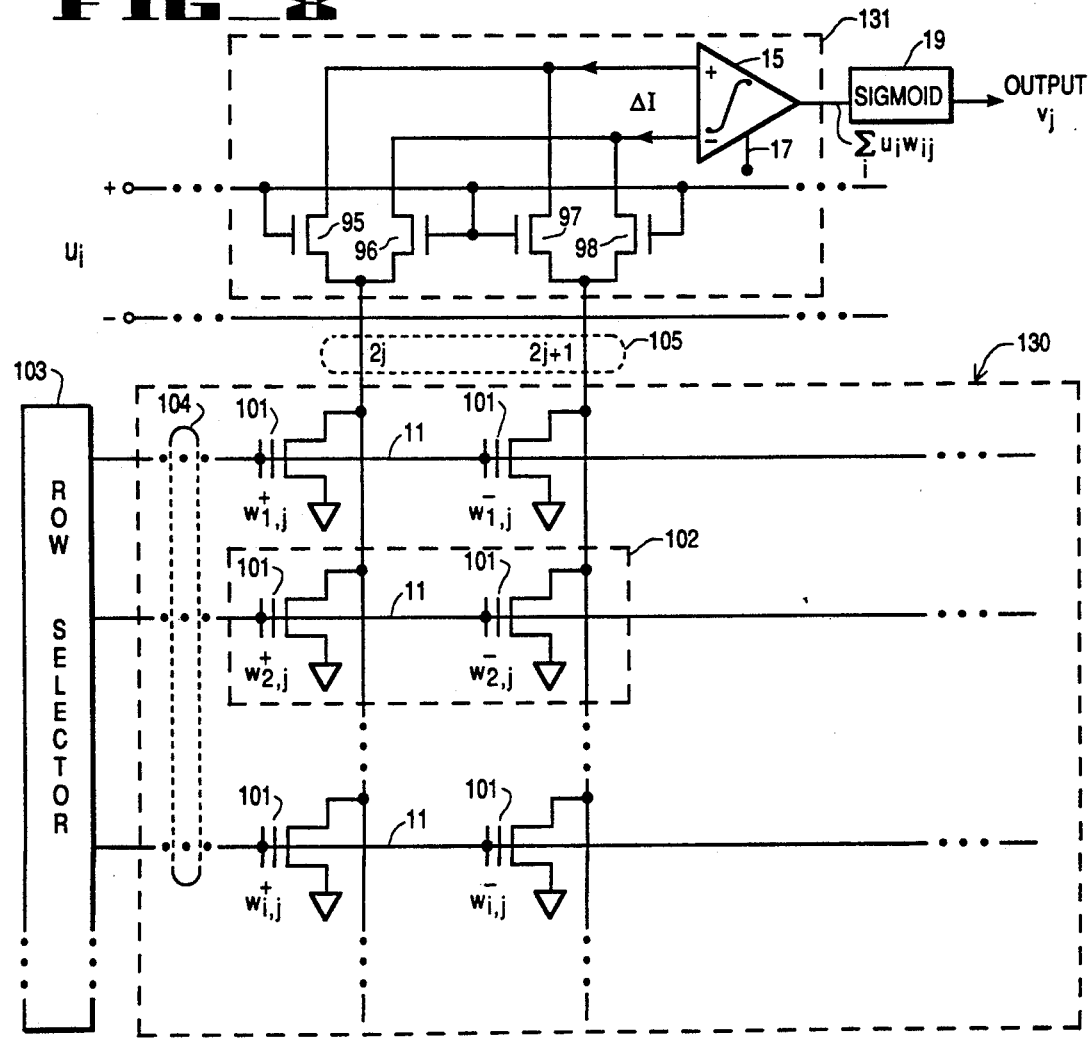
FIG_8

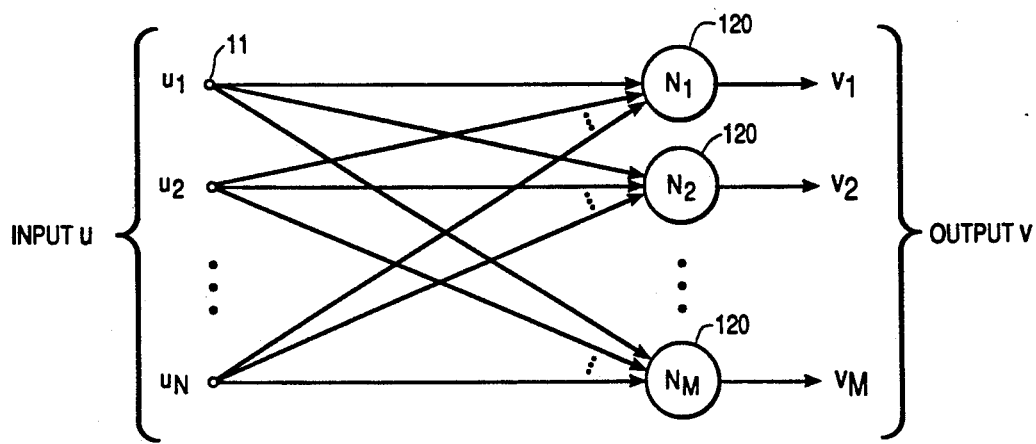
FIG_9
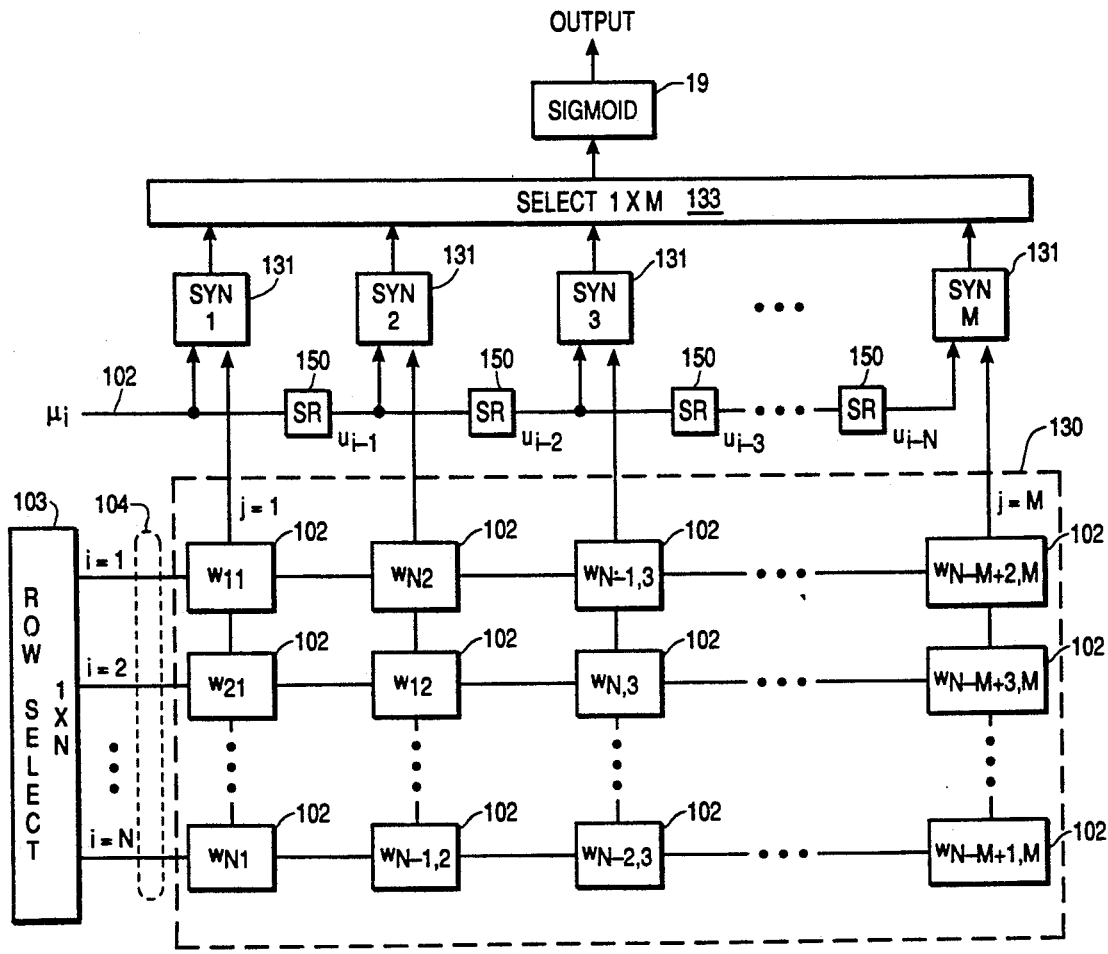
FIG_10

FIG_11
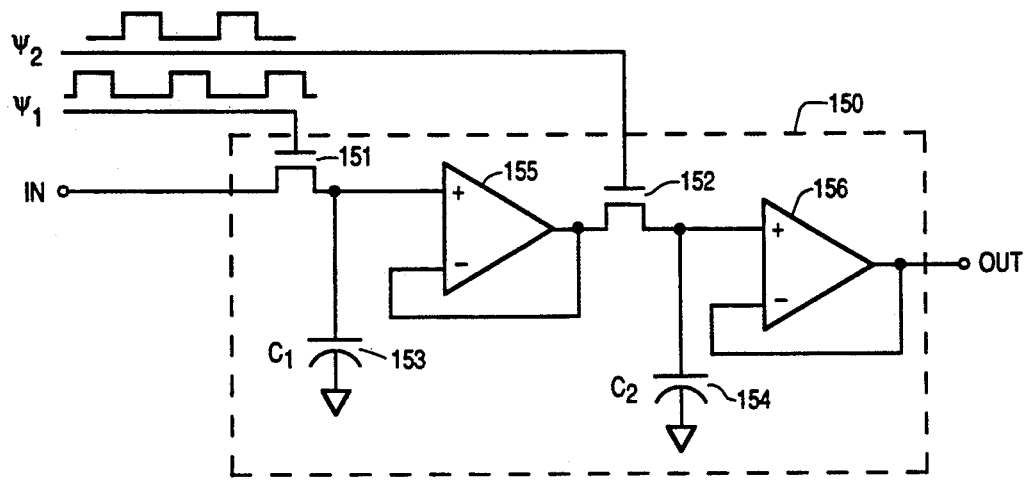
FIG_13
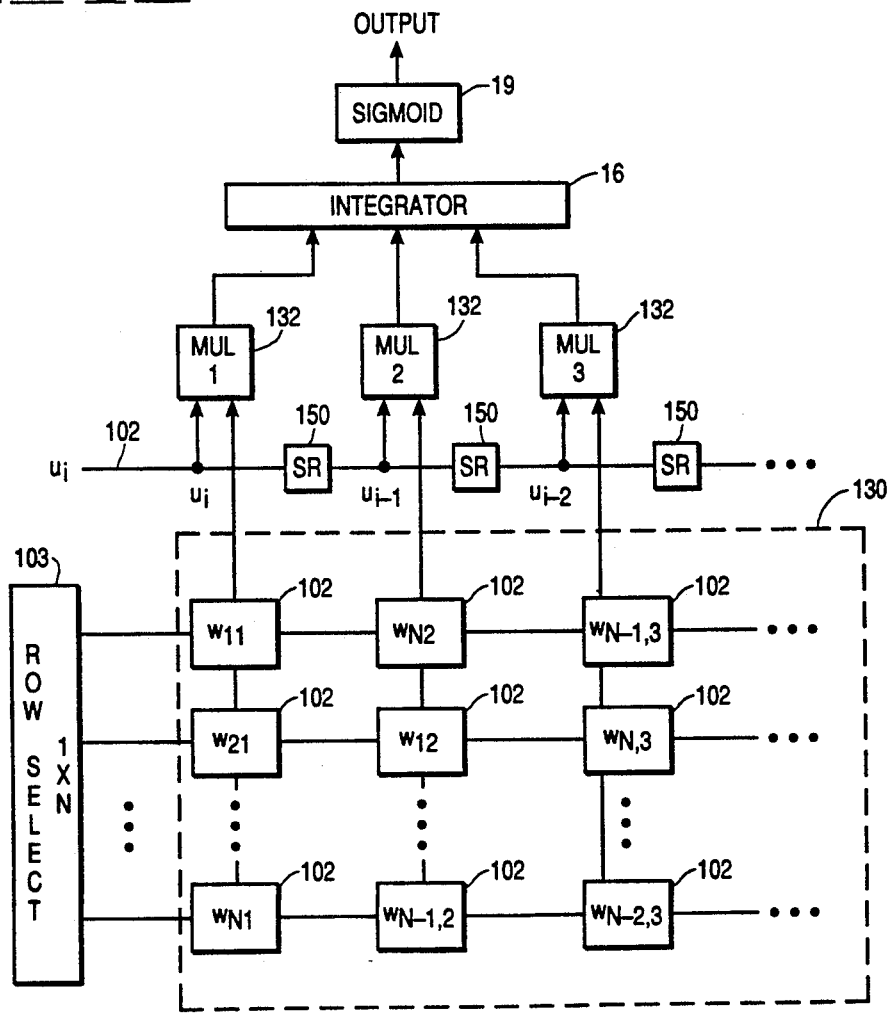

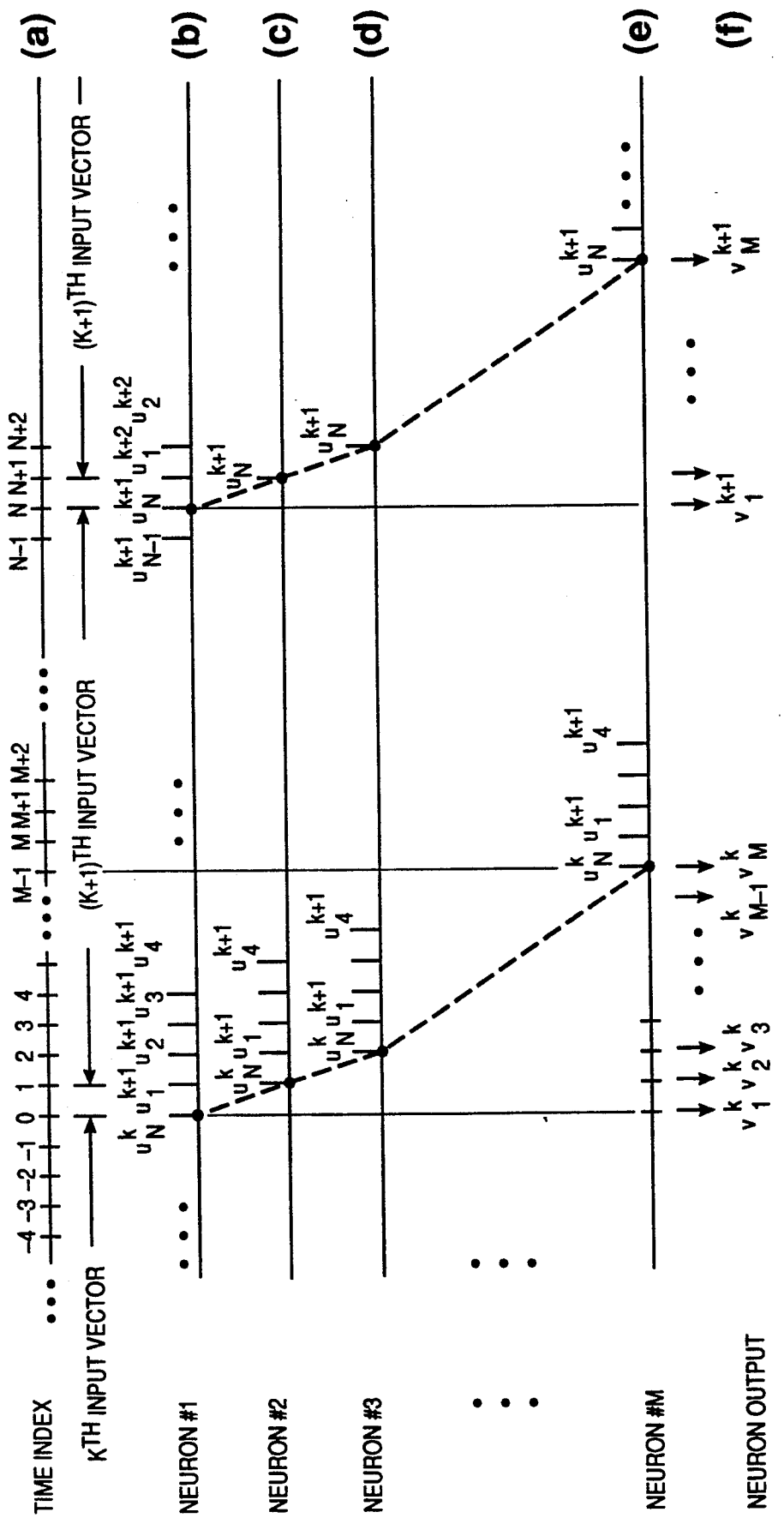

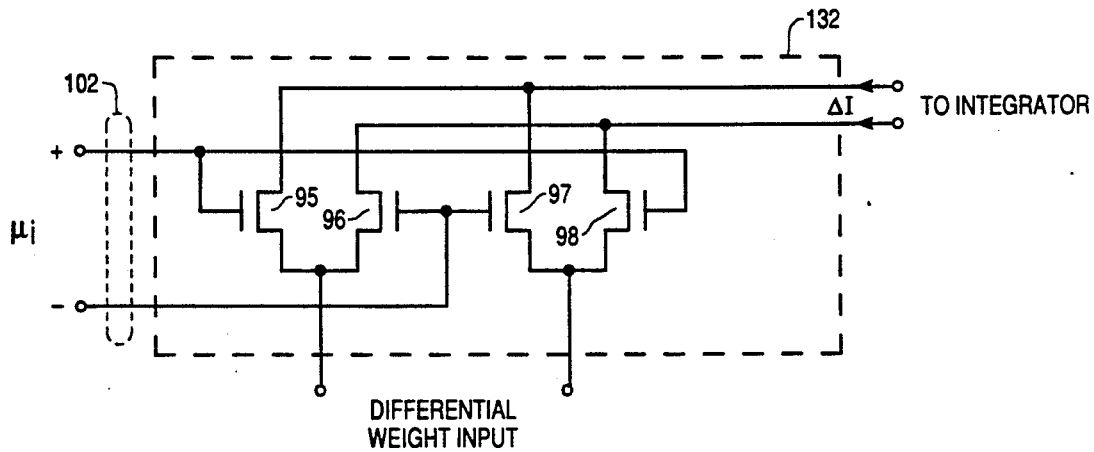
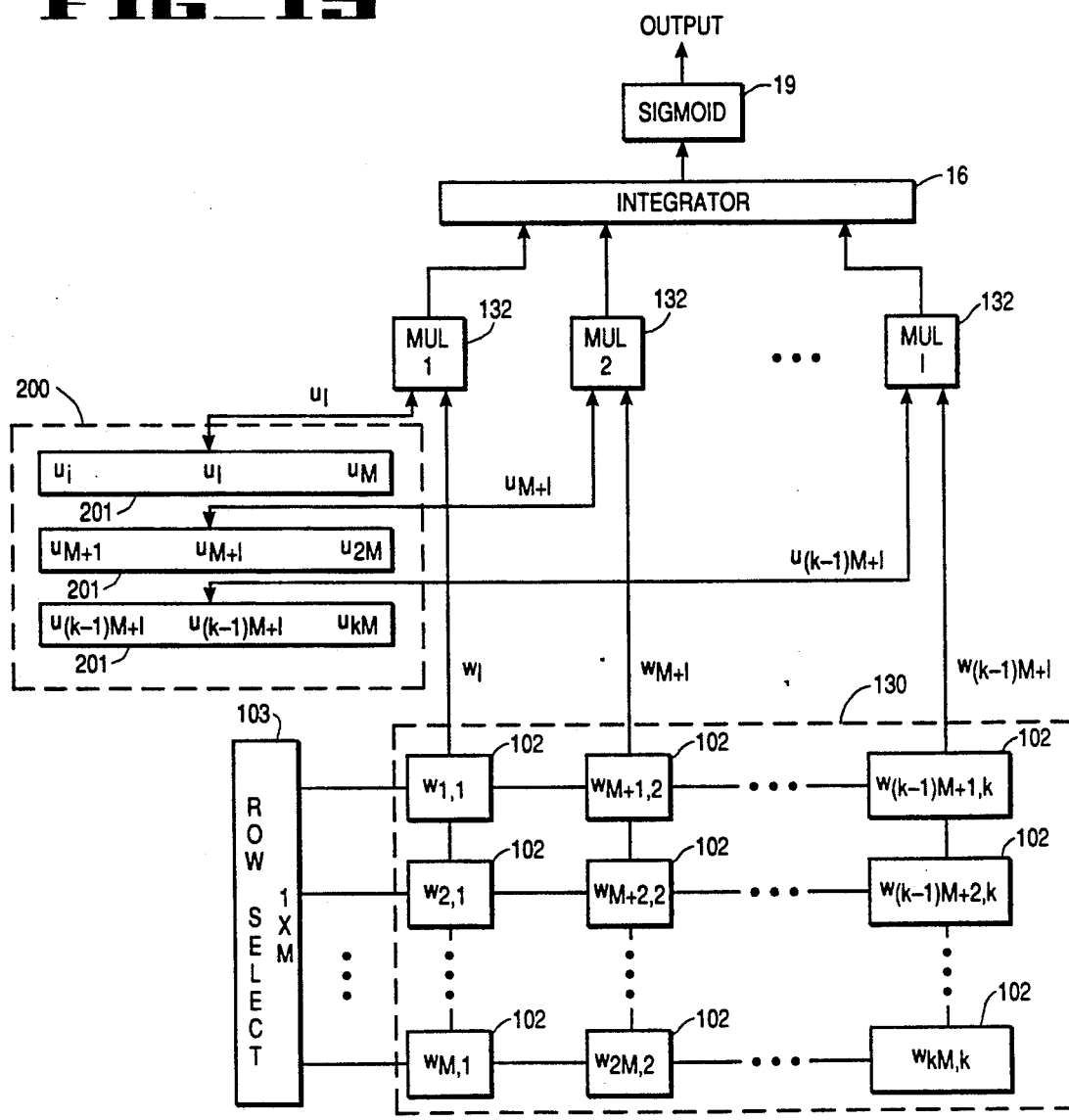

NEURAL NETWORK WITH MULTIPLEXED SNYAPTIC PROCESSING

FIELD OF INVENTION

The invention pertains to the field of associative networks for emulating higher-order functions of the cortex of the human brain. More specifically, the invention pertains to multiplexed operation of neural cell resources resulting in a more economic implementation.

BACKGROUND OF THE INVENTION

FIG. 1 is a block diagram of a McCollough-Pitts (MP) type neuron widely in use today. The unit has a set of parallel input ports 11 for accepting an N-element input vector, $[u_1, u_2, \ldots, u_N]^T$. Weighing elements 13 scale (or multiply) their corresponding input vector elements to form a set of product terms, $\{u_j w_{ij}\}$, each of which is applied to adder unit 15 to form the vector dot-product, $[u \cdot w] = \Sigma u_j w_{ij}$. Also, an offset or bias term, $\theta_i$, applied to input 12 may be added to form the sum $[u \cdot w]_i + \theta_i$. Each input branch consisting of an input data element 11 and a weighting element 13 corresponds to a neural synapse. The sum out of adder 15 is applied to a nonlinear element 19, usually having a sigmoidal transfer characteristic to form the neuron cell output signal.

One realization of the synapse portion of the MP type neuron shown in FIG. 1 may be found in U.S. Pat. No. 4,956,564, Sep. 11, 1990, by Holler et al. The patent discloses "a synapse cell for providing a weighted connection between an input voltage line and an output summing line having an associated capacitance". In this case, the "associated capacitance" performs the summing function of adder 15. A single synaptic element of the above reference, shown in FIG. 2, is a four quadrant multiplier using floating gate transistors 40–43, differential input lines 50 and 51, and differential output lines 44 and 45. The drains of transistors 40 and 42 are coupled to current summing line 52 while the drains of transistors 41 and 43 are coupled to current summing line 53. Summing line 52 and 53 have at nodes 44 and 45 associated capacitances 46 and 47, respectively, for accumulating charge. Select devices 60 and 62 are n-channel transistors for selectively connecting the sources of floating gate transistors 40 and 42 to line 64; devices 61 and 62 selectively connect transistors 41 and 43 to line 65. Return lines 64 and 65 are also used for erasing and normal reading operations.

For positive inputs, a voltage pulse of $t_{pp}$ seconds is applied to input line 50 while for negative inputs a voltage pulse of $t_{pn}$ seconds is applied to input line 51. The duration of the pulse is made proportional to the magnitude of the input signal. The charge associated with the current flow through the floating-gate devices is representative of the product of the input pulse duration and the stored weight in the floating gate devices. The stored charge on capacitances 46 and 47, and hence voltage across 46 and 47, represent the four quadrant multiplier output values in differential form, i.e., the voltage difference between output lines 44 and 45.

For each input synapse of a given neuron, a structure similar to that shown in FIG. 2 is required. FIG. 3 shows a typical single layer neural network with N input channels and M neurons. Thus, N×M multiply units 13 are required, each similar to that shown in FIG. 2 or its functional equivalent. Line 21, the input line to accumulator 15, would be a differential input line pair, corresponding to lines 44 and 45 of FIG. 2, if that type of differential multiplier were to be used. Similarly, input line 11 would correspond to differential input lines 50 and 51.

Other forms of multiplier (weighting) elements may be used, based on the four quadrant transconductance multiplier cell shown in FIG. 4. (See J. Watson, "Analog and Switching Circuit Design", Adam Hilger Ltd, Bristol, 1984, pp. 134–140). The product of inputs 102 and 77 are represented by the current difference, $\Delta I$, which corresponds to the difference in collector currents flowing in leads 71 and 73. Thus, assuming matched transistors (81–86), $$\Delta I = I_x \tanh\left(\frac{u_j q}{2kT}\right) \tanh\left(\frac{w_{ij} q}{2kT}\right) \quad (1)$$

where q is the charge on an electron,
k is Boltzman's constant,
T is the absolute temperature.

For x small, $\tanh x \approx x$ so that equation (1) may be approximately represented by $$\Delta I \approx I_x \left(\frac{q}{2kT}\right)^2 u_j w_{ij} \quad (2)$$

One synapse implementation shown in FIG. 5, the commercially available Intel Model 80170NX electrically trainable analog neural network (manufactured by Intel Corporation, 3065 Bowers Avenue, Santa Clara, Calif., 95051), is based on a transconductance four quadrant multiplier using CMOS technology. Transistors 93 through 98 form a four quadrant multiplier unit similar to the type described above. The differential input vector component, ui, is applied by input lines 102 and the differential weights, $w_{ij}{}^+$ and $w_{ij}{}^-$, supplied by EEPROM cells 900, are applied to the gates of transistor 93 and 94, respectively. Select line 92 activates cells 900 by applying Vcc to the gates of transistors 91 and 99 that act as control switches for applying the drain voltage, Vd, and the control gate voltage, Vcg, to floating gate transistor 90 of each EEPROM cell 900. By selecting appropriate values of Vcg, Vd and source voltage, Vs, stored weights values ($w_{ij}{}^+$, $w_{ij}{}^-$) in the floating gate transistors 90 may be modified or applied to transistors 93 and 94 of the four quadrant multiplier. The differential output current, $\Delta I_j = I_j{}^+ - I_j{}^-$, available on output leads 21, is representative of the product $u_j * w_{ij}$, where $w_{ij} = w_{ij}{}^+ - w_{ij}{}^-$.

As in the previously described synapse implementation by Holler et al., a single layer network of N inputs and M neurons requires an interconnected matrix of N×M synapse cells.

To change the weights stored in the differential pair of EEPROM cells 900, charge is added to one cell's floating gate and subtracted from the other using Fowler-Nordheim tunneling. Tunneling is commonly used in conventional EEPROM devices by applying high voltages across a thin dielectric causing electrons to "tunnel" directly through the dielectric. The Intel model 80170NX synapse multiply characteristics, shown in FIG. 6, are plot of differential output current, $\Delta I_j$, versus input voltage, $u_j$, for various values of differential voltage stored in the floating gates of the EEPROM cell pair.

Because artificial neurons find application to problems requiring substantial parallel processing (many neural cells simultaneously active), the above implementations have the disadvantage of requiring N×M multipliers for each neural network layer of N input channels (input vector elements) and M neurons. This requirements limits the capacity (N×M) of any integrated circuit implementation. Also, accommodation of large input vectors and output vectors is difficult because of the large number of pins required. These two problems provide motivation for the present invention to be described.

BRIEF DESCRIPTION OF THE INVENTION

The present invention covers artificial neurons using a multiplexed synapse array based on the flash EEPROM floating-gate memory technology. The synapse array provides the input multi-channel weighting means to an artificial neuron cell by forming the vector dot-product of the multi-channel input data vector and a stored reference vector. Analog multiplication is accomplished by using a transconductance four-quadrant multiplier circuit. Significant savings in the number of transistors per synapse required is achieved by using a flash memory array. Each of its memory cells uses a floating-gate transistor to store an analog weight in the form of a charge on the floating gate. Pairs of transistors are used to store differential analog weights, $w_{ij}$, representative of the value of a specific reference vector component by controlling the differential transconductance. When any such pairs of floating-gate transistors is used in a four-quadrant transconductance multiplier, the output signal is representative of the product $u_j * w_{ij}$, where $u_j$ is the input data value applied to the other differential input terminals of the multiplier. Thus, by selectively multiplexing floating gate transistor-pairs into a common transconductance four quadrant multiplier circuit a significant savings in component count per synapse structure is realized.

Another object of the present invention is to provide means for multiplexing input data channels in order to minimize the input data pin count.

Another object of the present invention is to provide pipeline processing of synaptic data thus providing more uniform input and output data rates, thus minimizing the output pin count and bandwidth requirements.

Another object of the present invention is to provide an efficient vector dot-product circuit for general signal processing requirements.

BRIEF DESCRIPTION OF THE DRAWINGS

The novel features believed characteristic of the invention are set forth in the appended claims, The invention itself however, as well as other features and advantages thereof will be best understood by reference the description which follows, read in conjunction with the accompanying drawings, wherein:

FIG. 1 represents a typical prior art McCullough-Pitts (MP) artificial neuron.

FIG. 2 is a prior art differential synapse cell in accordance with U.S. Pat. No. 4,956,564.

FIG. 3 is a prior art, commercially available,. electrically trainable analog neural network.

FIG. 4 is a circuit diagram of a four-quadrant differential multiplier.

FIG. 5 is a simplified schematic of a prior art EEPROM synapse implementation using a four-quadrant multiplier.

FIG. 6 shows the multiply characteristics of the prior art EEPROM synapse of FIG. 5.

FIG. 7 is a simplified diagram of a flash (EEPROM) memory array.

FIG. 8 shows a flash memory array based neuron with multiplexed multiplier.

FIG. 9 shows an equivalent non-multiplexed single layer neural network.

FIG. 10 shows the structure of a pipelined and multiplexed neural network.

FIG. 11 shows a typical analog pipeline shift register element.

FIG. 12 is a timing diagram for the pipelined network of FIG. 10.

FIG. 13 is a block diagram of a pipelined and multiplexed neural network with parallel multipliers sharing a common integrator.

FIG. 14 shows the details of the multiplier units used in FIG. 13.

FIG. 15 is a block diagram of a parallel processing neuron cell with a multi-input integrator and segmented single vector input.

DETAILED DESCRIPTION

FIG. 7 shows a simplified diagram of an EPROM flash memory array. Each memory cell 101, comprises a single floating gate transistor connected in a two-dimensional addressable matrix. The control gates of a given row may be activated by selecting any one of the row-select lines 104 and applying an appropriate voltage level. Similarly, a specific transistor cell 101 along the selected row is chosen by selecting the appropriate column select line 105. Thus, selecting row i and column 2j would select the memory cell having $w_{i,j}{}^+$ stored on its floating gate.

By selecting two columns, say 2j and 2j+1, a pair of floating gate transistors having weights $w_{i,j}{}^+$ and $w_{i,j}{}^-$ could be made available for use as transistor pairs corresponding, respectively, to transistors 93 and 94 of the transconductance multiplier shown in FIG. 5.

FIG. 8 shows how a flash memory array may be used to create a multiplexed neural cell. The neural cell comprises synaptic weight flash memory array 130, auxiliary synaptic unit 131, row selector 103, and output non-linearity 19. Pairs of columns of the flash memory array, say 2j and 2j+1, are connected to the sources of transistors 95, 96 and 97, 98 respectively. The drain of these transistor pairs are connected differentially to accumulator (integrator) 15 which accumulates the differential drain current flow, ΔI. The control gates of the transistor pairs 95, 96 and 97, 98 are differentially connected to a balanced input terminal pair 102. Row selector 103 provides output voltage levels that are selectively applied to gate control lines 11, thereby activating a single row of differential weights, $$\{w_{i,j} = w_{i,j}{}^+ - w_{i,j}{}^-\}.$$

Because the floating gate charge controls the drain to source conductance in proportion to the stored weights, the differential current flowing into accumulator 15 is representative of the product $u_i * w_{ij}$. In order to form the complete dot-product, $\Sigma u_i w_{ij}$, the input data vector values are sequentially selected (i.e., $u_1, u_2, \ldots, u_N$) while row selector 103 sequentially selects the corresponding weights ($w_{1j}, w_{2j}, \ldots, w_{Nj}$). In this manner, input data vector values, $\{u_i\}$, are multiplexed as well as the stored reference vector values, $\{w_{ij}\}$. The offset (threshold) value, i.e. $\theta_j$ of FIG. 3, may be introduced by having an input value, $u_k=u$, to assume a standard full scale or other standard value which is suitably scaled by the floating gate transistor of a prescribed row (k) of the memory array to form $\theta_j = u * w_{kj}$.

The output of accumulator 15, representative of the vector dot-product is applied to the output sigmoidal nonlinearity 19 to produce the $j^{th}$ neural response, $v_j$. For each available flash memory column cell pair ($2_j$, $2_j+1$), a similar arrangement permits parallel implementation of multiple neurons, each acting on the same elements of input vector, u, and simultaneously generating a multiplicity of unique vector dot-products. This mode of operation corresponds to a single layer multi-neuron network as shown in FIG. 9. The input to the single layer neural network of FIG. 9 is the $N \times 1$ input vector, u, on input lines 11 and is shown fully interconnected with M neuron cells 120 of the type shown in FIG. 1.

A direct comparison of the synapse implemented in FIG. 5 using EEPROM cell technology and that of FIG. 8 implemented using flash EPROM cell technology clearly shows the significant reduction in complexity achieved by the latter embodiment. Each EEPROM cell 900 requires 3 transistors (6 for each differential pair ($w_{ij}{}^+$, $w_{ij}{}^-$)) in addition to 6 transistors for implementing the four quadrant multiplier, a total of 12 transistors per synapse. The multiplexed flash EPROM of FIG. 8 each require 2 transistors for each differential weight pair in addition to 4 transistors (95-98) for completing the multiplexed four quadrant multiplier. Hence, for a single layer neural network, such as in FIG. 9, the ratio of the number of transistors required for the flash EPROM implementation to the number required for the EEPROM implementation is $$\frac{2N+4}{12N} = \frac{1}{6} + \frac{1}{3N}$$

or approximately a reduction of 6 to 1 for any reasonable value of N. This reduction reduces the silicon area required, as well as the power consumption.

In another preferred embodiment, the dynamic range of the transconductance multiplier units may be extended by varying the length of time over which the differential current, $\Delta I$, is accumulated in integrator 15 of FIG. 8. Control line 17, when asserted, causes integrator 15 to operate as an integrator which accumulates the change due to the current flow of $\Delta I$. When control line 17 is de-asserted, the integration stops. This action can be expressed mathematically as $$\int_0^{T_i} \Delta I_i dt = \int_0^{T_i} u_i w_{ij} dt = u_i w_{ij} T_{ij}$$

so that the total contribution at output of integrator 15 of the $j^{th}$ column is represented by the sum $$\sum_i \int_0^{T_{ij}} u_i w_{ij} = u_1 w_{1j} T_{1j} + u_2 w_{2j} T_{2j} + u_3 w_{3j} T_{3j} + \cdots$$

where $T_{ij}$ is the interval of time that control line 17 is asserted for the ith weighting pair of the $j^{th}$ column ($w_{ij}{}^+$, $w_{ij}{}^-$) Thus, the combined weight $w_{ij}T_{ij}$ provides a means for extending linear dynamic range of weight $w_{ij}$.

This method may also be used to extend the dynamic range of the input $u_i$ by making all $T_{ij}=T_i$. In other words, by applying the same integration time interval to all neurons at the same level, i. And similarly, extending both of the dynamic ranges of the weights, $\{w_{ij}\}$, and input values, $\{u_i\}$ by making $T_{ij}$ proportional to the product of a weighting scaling factor and an input scaling factor.

It should be recognized that many different realizations are possible:

(1) the flash array transistors may be a standard flash memory chip with the auxiliary synaptic circuitry, i.e. transistors 95-98 and units 15 and 19, off-chip;

(2) both flash memory and auxiliary synaptic circuitry may be consolidated on a single chip;

(3) multiple flash memory units may be connected to extend the column length of the input vector;

(4) complete synaptic chips, each including a full complement of auxiliary synaptic circuitry and flash memory, may have the individual synapse outputs jammed across the array of chips to extend the input vector length; and (5) some level of multiplexing of the auxiliary synaptic circuitry across flash memory column pairs.

Other possible variations to those suggest will be evident to those skilled in the art.

Because the availability of output pins may be severely limited and because the basically parallel structure described in the above embodiment produces simultaneous parallel outputs from each column neuron it may be advantageous to organize the network as a pipeline process producing neuron outputs sequentially in time. This would reduce the output pin requirement by multiplexing a multiplicity of neuron outputs to a single output port.

FIG. 10 is a block diagram of a neural network with both input and output multiplexing. Memory array 130 comprising $N \times M$ memory 101 cells and row selector 103 are as previously described in FIG. 8. Auxiliary synaptic units 131, also described in FIG. 8, are connected to an associated memory cell set of $j^{th}$ column pairs, $\{w_{i,j}{}^+, w_{i,j}{}^-\}$. Each pair represented as memory cell unit 102 with a corresponding weight of $w_{i,j}$. The serially multiplexed input values, $\{u_i\}$, on input line 102 are supplied to auxiliary synaptic units (SYN) 131 from taps on all analog delay line comprising serially connected delay elements (SR) 150. In this manner, each synaptic unit (SYN$_1$ to SYN$_m$) receives a particular input vector element delayed with respect to its neighbor, i.e., SYN$_k$ receives the value $u_i$ one unit of time before SYN$_{k+1}$. Each SYN unit 131 forms a vector dot-product as in the previous embodiment except shifted in time by one unit relative to its neighbor.

The output of each SYN unit 131 is connected to analog selector means 133 accommodating M inputs. (The selector may be a set of M field effect transistors operating as analog switches.) The output of selector 133 is applied to output non-linearity 19 which provides the squashed output for the selected synaptic set. Alternatively, M nonlinear networks could be connected, on each at the output of each SYN 131 network, each output of nonlinear networks 19 being supplied to output select unit 133 which then delivers at its output the time division multiplexed neuron output values.

FIG. 11 is an example of an analog delay element (SR 150) employing two n-channel field effect transistors 151 and 152 whose gates are controlled by clock signals $\Psi_1$ and $\Psi_2$ respectively. The input signal is applied to capacitor 153 through transistor 151 by clock signal $\Psi_1$, when asserted positive. During the next half period, $\Psi_1$, is de-asserted and clock $\Psi_2$ asserted causing the voltage on capacitor 153 to be transferred through op-amp 155 and transistor 152 to capacitor 154 and appear at the output terminal of op-amp 156. On the next half cycle $\Psi_1$, is again asserted and the process continues. In this manner the input voltage at transistor 151 at the beginning of a cycle is transferred to the output of SR 150 after one clock period delay.

FIG. 12 shows the timing relationship between serially multiplexed input vector elements, $\{u_i^k\}$, and the availability of neuron output values, $\{v_j^k\}$. Line (a) represents the time index. Lines (b)-(e) represent the arrival of input values at the M delay line taps. For example, at time t=0, SYN (1) has, $u_{Nk}$, available (and $w_{N1}$ available from memory 130 simultaneously) to form the product $u_N^k \cdot w_{N1}$. In this case the superscript, k, denotes that $u_N$ is the $N^{th}$ component of the $k^{th}$ input vector, $u^k$. Because this represents an on-going process, the complete vector dot-product, $w_i^T \cdot u^k = {}_i\Sigma u_i^k w$ it is available at the output of SYN(1). At the same time, sigmoid nonlinearity 19 produces the squashed output $v_1^k$ through output selector means 133 as shown on line (f) of FIG. 12. Similarly, at time (or clock) index 1, the output of nonlinearity 19 corresponds to the second neuronal output for the $k^{th}$ input vector, $v_2^k$. At time index M−1, the $M^{th}$ neuronal output, $v_M^k$, is available. The output switching sequences is repeated N time index intervals later for input vector $u^{k+1}$, producing the set of outputs $\{v_j^{k+1}\}$, for j=1, 2, . . . , M.

This method of operation implies a staggered set of stored weights as indicated in memory array 130 of FIG. 10, where each square is labelled to indicate the contents of each differential memory cell 102, i.e. row one (i=1) contains the following ordered set:

$$\{w_{1,1}, w_{N,2}, w_{N-1,3}, w_{N-2,4}, \ldots, w_{N-M+2, M}\}$$

Each succeeding column is rotated downward by a single unit thereby introducing the required shift so that corresponding pairs of delayed input vector elements, $u_i^k$, will be available at each of the M delay-line taps together with selected row weight contents, $w_{ij}$ to form the proper product term.

In another embodiment, the parallel processing neuron cell shown in FIG. 13, weight memory array 130, row select unit 103, analog delay units (SR) 150 and output non-linearity 19 are as previously described and shown in FIG. 10. However, in this embodiment, a single, multi-input integrator 16 accepts the parallel output of a multiplicity of multiplier units 132. Each multiplier unit 132 comprises four field effect transistors 95, 96, 97, and 98 as shown in FIG. 14. Thus, by separating the integrator unit 15 from synaptic unit 131 of FIG. 8, it is possible to share a single integrator unit for parallel accumulation of product terms. If, as shown in FIG. 13, three multiplier networks 132 (MUL1, MUL2 and MUL3) were to share a single integrator 16, then input values $\{u_i\}$ would be shifted by three input samples each time a new set of values were to be generated. In general, K multipliers units 132 feeding a single integrator 16 would require shifting input values by K time units for each output value.

In a further variation of the parallel processing neuron cell of FIG. 13, multiple parallel input vectors may be supplied from an external source obviating the need for a tapped delay line using SR memory elements 150. For example, inputs $u_i$, $u_{i-1}$, and $u_{i-2}$ would be supplied by three separate input lines. More generally, as shown in FIG. 15, the input vector, u, may be stored as non-overlapping segments in FIFO memory unit 200 which is organized as a multiplicity of parallel FIFO output units 201. For the example shown, a $kM \times 1$ input vector is stored in k parallel FIFO units 201 so that each 201 unit simultaneously supplies a set of k input vector components $(u_l, u_{u+l} \ldots u_{(k-1)M+l})$ to one operand input of a corresponding auxiliary multiplier unit 132, causing the product terms $$(u_l \cdot w_{l,1}, u_{M+l} \cdot w_{M+l,2}, \ldots, u_{(k-1)M+l} \cdot w_{(k-1)M+l,k})$$

to be simultaneously formed at the output of the set of k multiplier units 132.

What is claimed is:

1. An artificial neuron synapse network for forming the vector dot-product of an input data vector and stored reference weighting vector, comprising:
   (a) memory means for differentially storing the values of the reference vector components by adjusting the output current values of pairs of current sources;
   (b) means for selecting said current source pairs;
   (c) differential transconductance multiplier means using said current source pairs, as a differential current source for forming a differential current output representative of the product of a differential input data vector component value and its corresponding reference vector component value; and
   (d) means for accumulating said differential currents to produce an output voltage representative of the vector dot-product of the input and reference vectors.

2. An artificial synapse network as in claim 1 wherein said memory means comprises a multiplicity of floating gate transistor pairs which store said reference vector values by means of a charge on pairs of transistor floating gates.

3. An artificial neuron synapse network as in claim 1 further comprising means for sequentially selecting input vector component values.

4. An artificial neuron synapse network as in claim 1 wherein said means for accumulating said differential currents further comprises means to control the time interval over which each said differential current is accumulated for increasing the effective dynamic range of said multiplier means.

5. An artificial neuron synapse network as in claim 3 further comprising:
   (a) memory means organized to store elements of a multiplicity of reference vectors as differential current sources;
   (b) means for simultaneously selecting a multiplicity of corresponding reference vector components that are to be multiplied by the selected input data vector component;
   (c) multiplicity of differential transconductance multiplier means using said differential current sources as current sources for simultaneously forming a multiplicity of differential currents representative of the product of the input vector component and said multiplicity of corresponding reference vector components; and
   (d) multiplicity of means for separately accumulating said differential currents so as to simultaneously form a multiplicity of output values representatives of the vector dot-product of the input vector and said multiplicity of stored reference vectors.

6. A multiple artificial neuron cell network comprising:
(a) memory means for storing elements of a multiplicity of reference vectors as differential current sources;
(b) means for simultaneously selecting a multiplicity of corresponding reference vector components that are to be multiplied by the selected input data vector component;
(c) multiplicity of differential transconductance multiplier means using said differential current sources as current sources for simultaneously forming a multiplicity of differential currents representative of the product of the input vector component and said multiplicity of corresponding reference vector components;
(d) multiplicity of means for separately accumulating said differential currents for simultaneously forming a multiplicity of output values representative of the vector dot-product of the input vector and said multiplicity of stored reference vectors; and
(e) nonlinear output means for converting said output voltage.

7. An artificial neuron synapse network as in claim 6 wherein said means for accumulating said differential currents further comprises means to control the time interval over which each said differential current is accumulated for increasing the effective dynamic range of said multiplier means.

8. An artificial neuron cell network as in claim 6 wherein said output transformation means has a sigmoidal transfer characteristic.

9. An artificial multi-neuron network comprising:
(a) means for sequentially selecting input vector component values;
(b) memory means for storing vector components of a multiplicity of reference vectors as differential current sources;
(c) means for simultaneously selecting a multiplicity of corresponding reference vector components that are to be multiplied by said selected input vector component value;
(d) multiplicity of differential transconductance multiplier means using said differential current sources as current sources for simultaneously forming a multiplicity of differential output currents representative of the product of said input vector component and said multiplicity of corresponding stored reference vector components;
(e) multiplicity of means for separately accumulating said differential currents causing the simultaneous formation of a multiplicity of output values representative of the vector dot-product of the input vector and said multiplicity of stored reference vectors; and
(f) nonlinear output means for nonlinearly transforming said vector dot-products.

10. An artificial multi-neuron network as in claim 9 wherein said means for separately accumulating said differential currents further comprises means to control the time interval over which each said differential current is accumulated for increasing the effective dynamic range of said multiplier means.

11. An artificial neural network as in claim 9 wherein said nonlinear transforming means is sigmoidal.

12. An artificial neural network as in claim 9 wherein said nonlinear output means further comprises selection means for sequentially applying said vector dot-product values for nonlinear transforming and outputting.

13. A pipelined artificial multi-neuron network comprising:
(a) means for sequentially selecting differential input vector component values;
(b) tapped delay-line means for accepting and delaying said selected input vector component values with a multiplicity of output taps, one for each neuron cell;
(c) memory means for storing vector components of a multiplicity of reference vectors as differential current sources;
(d) means for selecting a pair of differential reference vector component current sources corresponding to the input vector component value appearing at said associated tap;
(e) differential transconductance multiplier means using said selected current source pair as current sources and said associated tap output as the differential input for forming a differential output current representative of the product of said input vector component and said corresponding reference vector component;
(f) accumulator means for separately accumulating said multiplier differential output current for forming an output voltage representative of the vector dot-product of the input vector and said stored reference vector;
(g) nonlinear output means for nonlinearly transforming said dot-products to the desired neural output.

14. A pipelined artificial multi-neuron network as in claim 13 wherein said accumulator means further comprises means to control the time interval over which each said differential current is accumulated for increasing the effective dynamic range of said multiplier means.

15. An artifical neural network as in claim 13 wherein said nonlinear transforming means is sigmoidal.

16. An artificial neural network as in claim 13 wherein said nonlinear output means further comprises selection means for sequentially applying said dot-product values for nonlinear transforming and outputting.

17. A parallel processing artificial neuron synapse network comprising:
(a) memory means for storing elements of a reference vector as differential current sources in a number of non-overlapping segments;
(b) means for selecting one reference vector component from each said segments for similtaneous multiplication by a corresponding input data vector component;
(c) multiplicity of differential transconductance multiplier means using said differential current sources as current sources for simultaneously forming a multiplicity of differential currents representative of the products of the selected reference vector components and a set of corresponding input data vector component values; and
(d) means for accumulating said multiplicity of multiplier means outputs forming a single output value representative of the vector dot-product of the input vector and said stored reference vector.

18. A parallel processing artificial neuron synapse network as in claim 17 wherein said accumulating means further comprises means for independently controlling the accumulation time of each multiplier means output for improved dynamic range.

19. A parallel processing artificial neuron synapse network as in claim 17 further comprising tapped delay line means for accepting sequential values of the input vector and simultaneously producing at said taps a multiplicity of delayed input data vector values for multiplication by corresponding reference vector values stored in said memory means.

20. A parallel processing artificial neuron cell comprising:
   (a) memory means for storing elements of a reference vector as differential current sources in a number of non-overlapping segments;
   (b) means for selecting one reference vector component from each said segments for simultaneous multiplication by a corresponding input data vector component;
   (c) multiplicity of differential transconductance multiplier means using said differential current sources as current sources for simultaneously forming a multiplicity of differential currents representative of the products of the selected reference vector components and a set of corresponding input data vector component values;
   (d) means for accumulating said multiplicity of multiplier means outputs forming a single output value representative of the vector dot-product of the input vector and said stored reference vector; and
   (e) means for non-linear transformation of said dot-product.

21. A parallel processing artificial neuron cell as in claim 20 wherein said accumulator means further comprises means to control the time interval over which each said differential current is accumulated for increasing the effective dynamic range of said multiplier means.

22. A parallel processing artificial neuron cell as in claim 20 wherein said nonlinear transformation means is sigmoidal.

* * * * *

UNITED STATES PATENT AND TRADEMARK OFFICE
CERTIFICATE OF CORRECTION

PATENT NO. : 5,256,911
DATED : October 26, 1993
INVENTOR(S) : Holler et al.

It is certified that error appears in the above-identified patent and that said Letters Patent is hereby corrected as shown below:

In the title page at [54] delete "SNYAPTIC" and insert --SYNAPTIC--

In column 1 at line 3 delete "SNYAPTIC" and insert --SYNAPTIC--

In column 5 at line 2 delete "$u_k=u,$" and insert --$u_k=\bar{u},$--

In column 5 at line 5 delete "$\theta_j=u$" and insert --$\theta_j=\bar{u}$--

In column 7 at line 16 delete "$u_{Nk}=$" and insert --$u_N^k$

Signed and Sealed this

Eleventh Day of February, 1997

Attest:

BRUCE LEHMAN

Attesting Officer    Commissioner of Patents and Trademarks